A. S. DWIGHT.
APPARATUS FOR ROASTING AND SINTERING ORES.
APPLICATION FILED OCT. 21, 1914.
1,215,637.  Patented Feb. 13, 1917.
3 SHEETS—SHEET 1.
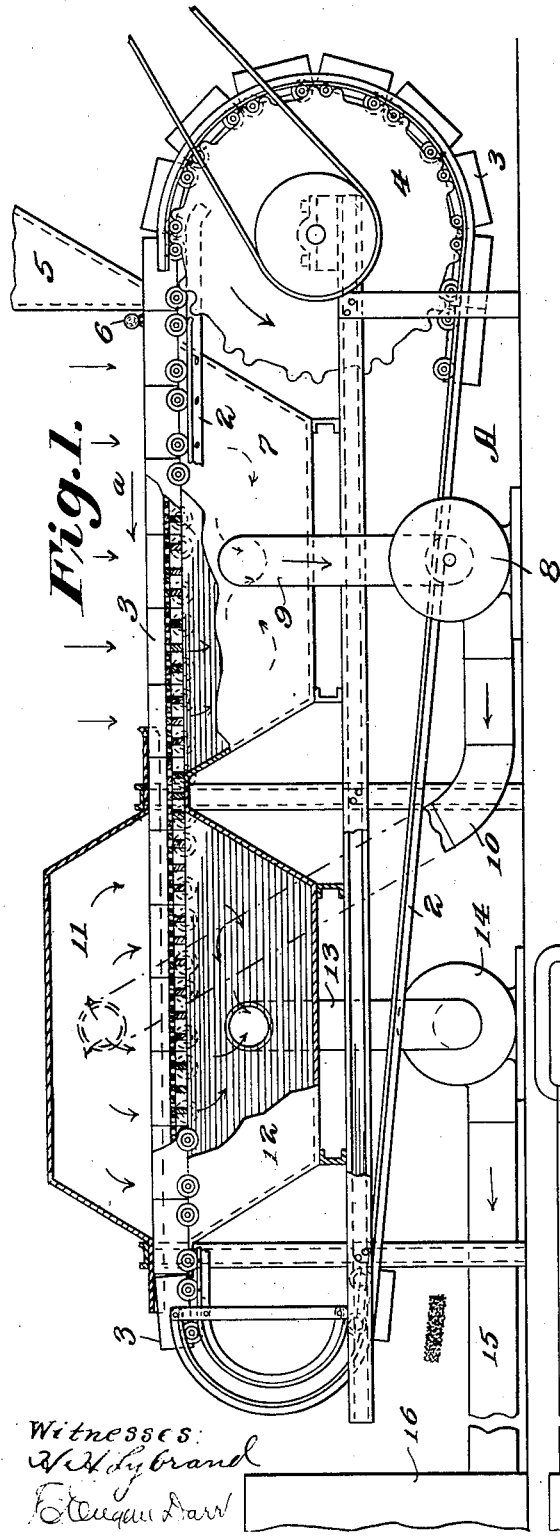
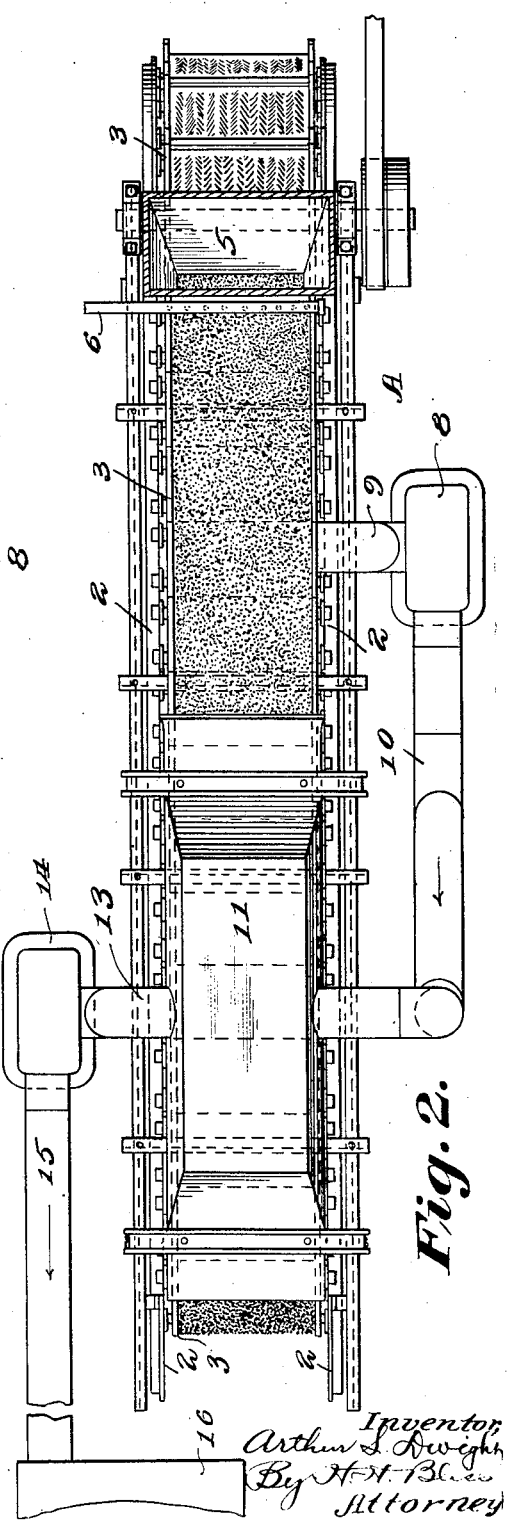

A. S. DWIGHT.
APPARATUS FOR ROASTING AND SINTERING ORES.
APPLICATION FILED OCT. 21, 1914.
1,215,637.
Patented Feb. 13, 1917.
3 SHEETS—SHEET 2.
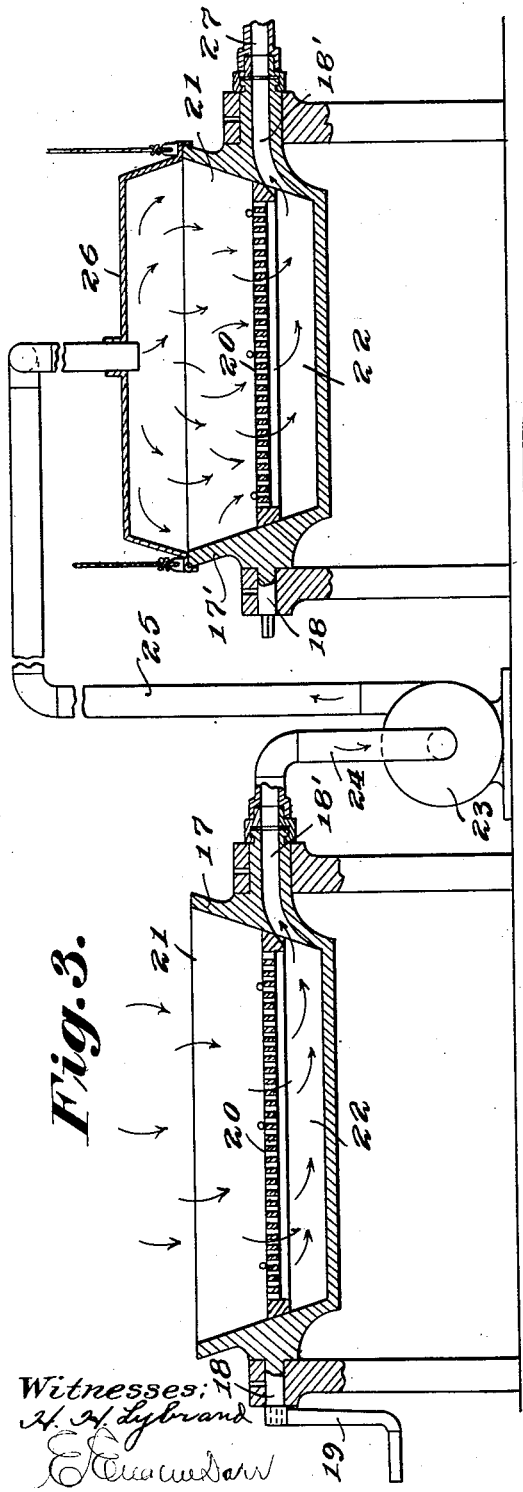
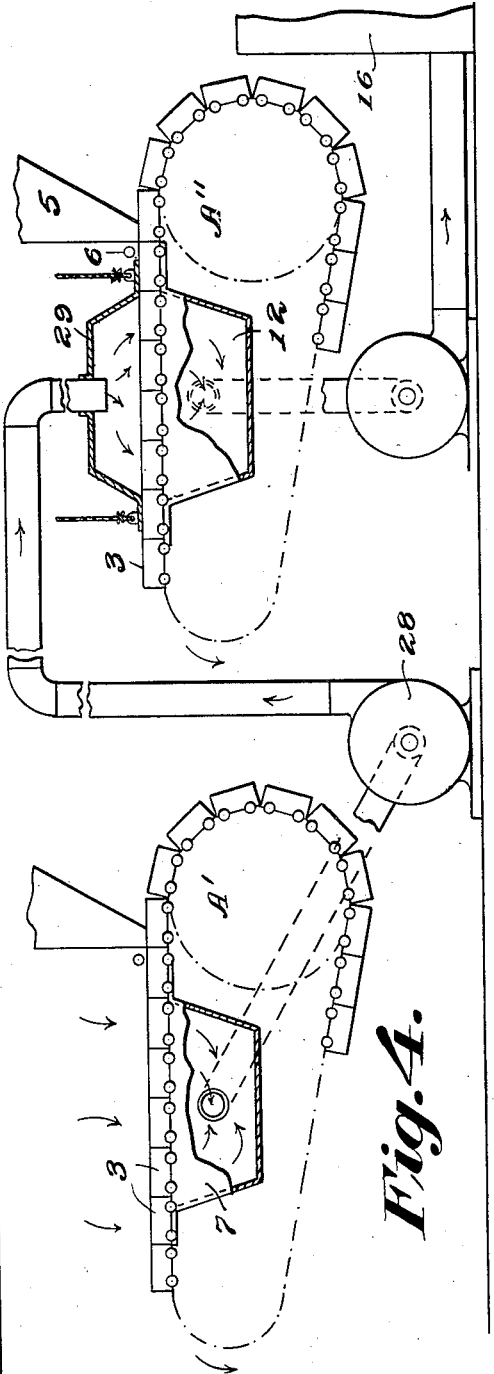

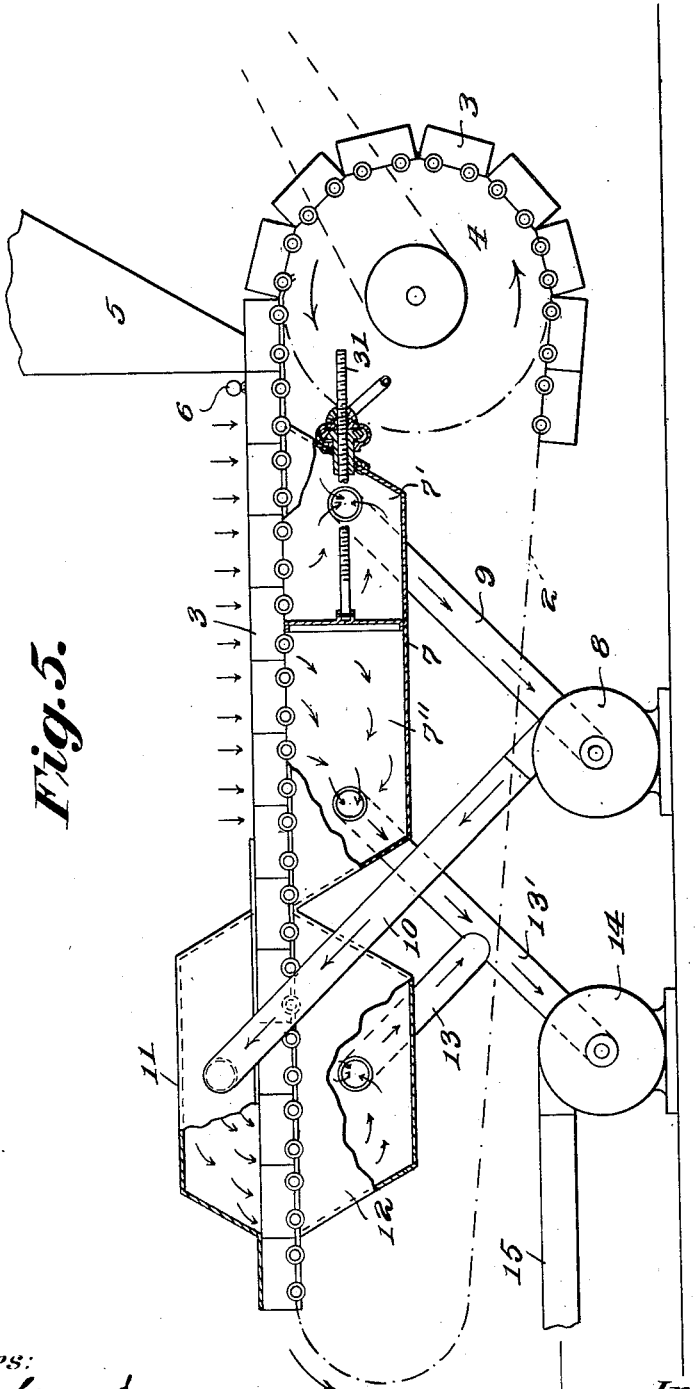

UNITED STATES PATENT OFFICE.

ARTHUR S. DWIGHT, OF NEW YORK, N. Y., ASSIGNOR TO DWIGHT AND LLOYD SINTERING COMPANY, INC., OF NEW YORK, N. Y., A CORPORATION OF DELAWARE.

APPARATUS FOR ROASTING AND SINTERING ORES.

1,215,637.  Specification of Letters Patent.  Patented Feb. 13, 1917.

Original application filed July 7, 1913, Serial No. 777,732. Divided and this application filed October 21, 1914. Serial No. 867,861.

*To all whom it may concern:*

Be it known that I, ARTHUR S. DWIGHT, a citizen of the United States, residing at New York, in the county of New York and State of New York, have invented certain new and useful Improvements in Apparatus for Roasting and Sintering Ores, of which the following is a specification, reference being had therein to the accompanying drawing.

My invention relates to the roasting of sulfur-bearing ores and has for its object to provide mechanism adapted to make possible the utilization, to a greater extent, and with less expense, than has heretofore been possible, of the valuable constituents of the ore, and particularly the sulfur, which it is the purpose of the roasting to eliminate or carry off. The gases which pass off during the roasting of sulfid ores by processes now in vogue contain small proportions of sulfur dioxid, often as low as from one to two per cent. by volume, and rarely as high as four or five per cent. Such gases, if discharged into the open air, are destructive to vegetation and injurious to animal life, but cannot be handled very economically for the recovery of the sulfur which they contain, owing to the relatively enormous volumes of gases that are required to be treated. In the roasting and sintering of sulfur-carrying ores by what is known as the Dwight and Lloyd process, the proportion of the sulfur dioxid passing from the furnaces, machines or apparatus, has been considerably increased, but even under the most favorable conditions the percentage remains low, requiring large flue areas to properly handle the gases, and comparatively expensive treatment when attempt is made to recover the sulfur therefrom.

In treating certain sulfid ores by the said Dwight and Lloyd process it is found that a part of the elemental sulfur is volatilized and carried away by the gases in the form of an exceedingly fine powder or sublimate which deposits on the inside of the flues or against any surface with which the gases may come in contact. This fine sulfur gives serious trouble by unexpectedly becoming ignited and burning fiercely for a few moments until the coating is consumed, which combustion often causes injury to the fan handling the gases, and in some cases causes damage to the flues themselves owing to the fact that the ignition and combustion is so rapid as to simulate an explosion.

It is the purpose of the present invention to provide means for eliminating the last referred to source of waste and danger and at the same time cheapening the process of roasting sulfur-carrying ores and reducing the cost of utilizing the sulfur contained in the gases produced during the roasting process, by largely increasing the proportion of sulfur dioxid in the gases finally delivered from the apparatus, thus enabling smaller flue areas to be employed, and permitting a more economical treatment of the gases for the utilization of the sulfur. These results I accomplish by constructing the roasting and sintering apparatus in such a way that I can successively treat separate bodies of ignited sulfur-bearing ore with the same body or volume of air, the air and the gases produced during the roasting of the first body of ore treated being delivered to the second body of ore being treated and supplying the oxygen for the roasting operations there taking place. The air has added to it the sulfur dioxid produced during the roasting of the second body of ore, thus increasing the volume of sulfur dioxid contained in the gases that are finally delivered to the apparatus employed for beneficiating the sulfur therein. I have been able to enrich the gas finally delivered to nine per cent. of sulfur dioxid, and I believe that this proportion can be still further increased.

The preferred embodiments of my invention are illustrated in the accompanying drawings, in which—

Figure 1 is a side view of a machine for roasting and sintering sulfid ores.

Fig. 2 is a top plan view of the apparatus shown in Fig. 1.

Figs. 3, 4 and 5 are side views of other forms of apparatus by which the invention may be carried out.

Referring particularly to Figs. 1 and 2, A designates an apparatus of well known construction for roasting and sintering ores. It consists essentially of an endless track 2 arranged to support and direct a series of small cars or pallets 3 that serve as the carriers or supporters for the ore during the roasting and sintering operations. The cars are caused to move slowly, in the direction indicated by the arrow *a*, by mechanism, typified by the wheels 4. Suitable means for feeding the ore to the pallets or ore holders 3 are provided, these being typified by the feed hopper 5, and means for igniting the ore after being delivered to the pallets are provided, such as indicated by the igniter 6.

After the ore, supported by the pallets 3, has been ignited, it is subjected to air which is caused to pass through the body or bodies of ore to induce internal combustion therein throughout the entire mass from surface to surface. 7 indicates an air box across the open end of which pass the pallets 3, the latter being so constructed as to form close joints with the edges of the air box 7, to prevent air leakage, as is well understood. A fan 8 is connected, by the pipe 9, with the air box 7 and operates to cause the air to pass through the ore in the pallets or holders above the box, as indicated by the arrows in Fig. 1. This fan is connected by a pipe 10 with a hood 11, arranged over those pallets that are situated between the pallets above the air box 7 and those at the discharge end of the apparatus which are about to deliver their roasted and sintered contents.

The air and gases delivered to the hood 11 are caused to pass through the ore contained in the pallets below the hood and into an air box 12, that is connected by pipe 13 with a fan 14 which discharges into a pipe 15, and this in turn delivers to the apparatus, designated diagrammatically at 16, where the gases are treated to utilize the sulfur which they carry.

The hood 11 is so disposed with reference to the path of travel of the pallets 3 that its edges come quite close to the upper edges of the pallets. Thus a close joint permitting practically no leakage of gas may be formed, although this is not necessary because a slight space may, often with advantage, be left between the edges of the hood and the edges of the pallets. This is because, in practice, the amount of gas discharged into the hood 11, which is regulated by the speed of the fan 8, is somewhat less than the amount of gas taken off by the suction caused by the fan 14. It follows from this that some atmospheric air will be drawn under the edges of the hood 11, thus preventing the escape or leakage of any sulfurous gas, which leakage would be objectionable and disagreeable. In the apparatus just described the fans 8 and 14 are suction fans. The gases taken from the wind or air box 7 by the fan 8 will ordinarily contain from two to four per cent. of sulfur dioxid, and more or less, depending upon the character of the ore, elemental sulfur in the form of a sublimate. In these gases there is still sufficient free oxygen to carry on the roasting operations in those pallets or ore receptacles that occupy the space between the hood 11 and the air box 12. The gases taken from the box 12 by the fan 14 and delivered to apparatus 16 are found to be much richer in sulfur dioxid than those taken from the air box 7, the proportion being raised to nine per cent. or more. It is found that, in an arrangement such as shown, the sulfur which passes off into the air box 7 in the form of a sublimate, does not deposit in the pipes 9 and 10, which are relatively short and are maintained at a high temperature, but is delivered into the hood 11 and finally disappears in passing through the ore contained in the pallets below the hood 11, being there oxidized.

In Fig. 3 I have illustrated an apparatus in which are employed non-traveling containers for the ore during the roasting operation. Referring to this view, 17, 17' designate independent ore receivers, each mounted upon trunnions 18, 18' so as to be free to be inverted, for discharging its contents. Means, either manual or power-operated, may be employed for effecting the inverting operations of these ore containers, such means being typified by the crank handles 19.

Each container has a perforated grate 20, an ore-receiving space 21 above the grate, and an air box or chamber 22 below the grate. The air chamber 22 communicates with the outside through one of the trunnions 18', which is hollow.

23 represents the fan disposed between the containers 17, 17' connected on one side by pipe 24, with the hollow trunnion 18' of the ore receiver 17, and on the other side, through pipe 25, with a hood 26 that fits closely over the upper end of the ore holder 17'. This hood is movable up and down, the pipe 25 having a slip joint connection to permit this, in order to allow the hood to be lifted to expose the ore receiving portion of the container to allow it to be filled, or to permit the holder as a whole to be tilted for discharging the roasted and sintered ore.

A pipe 27 leads from the hollow trunnion 18' of the ore holder 17' and delivers the gases to a treating apparatus 16, not shown in this view, but similar to that indicated in Fig. 1.

I have not in this view indicated the igniting means for setting fire to the ore at its exposed surface. It will, however, be understood that any suitable form of igniting device may be employed, the igniter or igniters being movable relative to the holders to permit the latter to be tilted for discharging and to permit the use of the hood 26.

In the apparatus last described it will be understood that the fan 23 operates to cause air to pass through the body of ore contained in the holder 17 by suction and through the body of ore in the holder 17' by plenum. In using this apparatus the ore in the holder 17' should be ignited before that in the holder 17 is ignited in order that the hood 26 may be brought to place before sulfurous gases are delivered through the pipe 25.

In Fig. 4 I have represented another apparatus embodying my invention. Here are indicated two apparatus, A', A'', similar in general principle to the apparatus illustrated in Figs. 1 and 2, where are employed a series of moving pallets for carrying the ore. In the apparatus A' air is induced to pass through the bodies of ore carried by the pallets 3 by suction induced by a fan 28. The proportions of the apparatus and the speed at which its various parts are moved are so adjusted that a complete roasting and sintering of the ore takes place during the time any particular body or mass thereof is passing the air box 7. In the apparatus A'' the plenum method of forcing the air through the ore is employed, the fan 28 delivering to the hood 29. The machine A'' is entirely distinct from the machine A', though the two apparatus are preferably arranged close together so that the length of the ducts between them is reduced as much as possible.

In Fig. 5 I have illustrated another feature of my invention, applied to an apparatus similar in general features to that indicated in Fig. 1, similar reference letters being employed for similar parts in these two views, Figs. 1 and 5.

The air box 7 below the series of pallets nearest the igniter is divided into two chambers 7' and 7'', by a movable partition 30 arranged to be manually adjusted, as by means of a screw 31.

It is found that the gases passing from the masses of ore nearest the igniter are relatively weak in sulfur dioxid, but contain a relatively large amount of elemental sulfur in the form of sublimate. I therefore connect that chamber of the air box 7 which is below the pallets nearest the igniter, designated 7', with the fan 8, and connect the outlet of this fan with the hood 11, the same as in the apparatus illustrated in Fig. 1. But the chamber 7'' of the air box is connected by a duct 13' with the fan 14, which is also connected with the air box 12 located below those pallets covered by the hood 11. Thus the stronger gases or those containing a larger amount of sulfur dioxid, are delivered directly to the fan 15 and by it to the apparatus 16 where the gas is treated, only part of the gases from the air box 7 being delivered to the hood 11 and caused to pass a second time through a body or bodies of ignited and sintering ore, to be freed of the sublimate which they carry, and enriched in sulfur dioxid. In using an apparatus such as shown in Fig. 5 the position of the partition 30 is adjusted to suit the working of the apparatus.

If lead ores are treated according to the process and by means of apparatus such as here described and illustrated, the gases will carry more or less volatilized lead or lead fume. A considerable portion of this will be recovered when the gases pass through a second bed of ignited and sintering ore, the same as it takes up and recovers the sulfur sublimate, as already described; for the semi-fused silicates will absorb and hold whatever lead fume comes in contact with them during the passage of the gases. The loss of lead may thus be diminished to a very considerable extent.

This application constitutes a division of my application for process for roasting and sintering ores, Serial No. 777,732, filed July 7th, 1913.

What I claim is:

1. In an apparatus for treating sulfid ore, the combination of an ore holder adapted to support a relatively shallow layer or stratum of the ore, means for passing air therethrough and causing combustion therein, means for collecting the air after it passes through the ore and also the sulfur gases carried thereby the aforesaid means being arranged as substantially set forth to form a porous sinter body from the ore, means for causing the air and sulfur gases in the said collector to pass a second time through the sintered ore to further effect the desulfurizing thereof and add sulfur gases to those already in the said air, substantially as set forth.

2. In an apparatus for the roasting of sulfur-bearing ore, the combination of two grate surfaces each adapted to support a layer of ore during the roasting operation, an air duct leading from the lower side of one grate surface to the upper side of the other grate surface, and means for causing air to flow downward through an ignited layer of ore on the first grate surface, then through the air duct and finally downward through an ignited layer of ore on the second grate surface.

3. In an apparatus for the roasting of sulfur-bearing ore, the combination of two grate surfaces, each adapted to support a layer of ore during the roasting operation, a fan, an air duct leading from the lower side of one grate surface to the suction side of the fan, and a second air duct leading from the pressure side of the fan to the upper side of the other grate surface, the arrangement being such that the fan sucks air downward through a layer of ignited ore on the first grate surface and forces the same air downward through a layer of ignited ore on the second grate surface.

4. In an apparatus for roasting sulfur-bearing ore, the combination of two grate surfaces, each adapted to support ore while being roasted, a box for collecting the products of combustion of the roasting ore on each grate surface, means for dividing the air box under one of the grate surfaces into two chambers, a hood covering the ore supported upon one of the grate surfaces, an air duct leading from one of the chambers of the divided air box to the said covering hood, a fan for causing the products of combustion from said chamber to pass into the said hood, and ducts leading from the other chamber of the said divided air box and from the air box below the air box of the hood-covered grate surface for taking the products of combustion therefrom.

5. In an apparatus for treating a mass of ore containing a combustible component, the combination of means for supporting a relatively thin layer of ore prior to its treatment and also supporting a layer of treated ore, means for igniting the ore of the first said layer at its surfaces, means for causing air to flow through the last named layer after ignition, and means for conducting the products of the combustion of said layer to and passing them through the second said section of treated ore.

6. In an apparatus for treating an ore mass containing a combustible, the combination of a conveyer adapted to transport a relatively thin layer of ore and permit its being ignited at its surface, means for causing air to flow through the ore layer after ignition and also causing said air to pass through the same ore after it has been transported to a second position.

7. In an apparatus for treating a mass of ore containing a combustible, the combination of means for supporting two stratum sections of the ore in a relatively thin layer and permitting it to be ignited at one of its surfaces, and means for successively passing the same current of air after ignition two or more times through the same stratum section.

8. In an apparatus for treating a mass of ore containing a combustible component, the combination of a conveyer adapted to support the ore in a relatively thin layer and permit it to be ignited at one of its surfaces and to carry it from one position to another, and means for successively passing a current of air one or more times through the said layer after ignition, the general direction of the flow of the air being the same as the direction of movement of the ore layer.

In testimony whereof, I affix my signature, in presence of two witnesses.

ARTHUR S. DWIGHT.

Witnesses:
HENRY J. STEHLI,
JOSEPH C. BENSON.